United States Patent
Kobayashi

(10) Patent No.: US 10,800,223 B2
(45) Date of Patent: Oct. 13, 2020

(54) AIR SUSPENSION SYSTEM

(71) Applicant: HITACHI AUTOMOTIVE SYSTEMS, LTD., Ibaraki (JP)

(72) Inventor: Kan Kobayashi, Yokohama (JP)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 70 days.

(21) Appl. No.: 16/332,988

(22) PCT Filed: Sep. 14, 2017

(86) PCT No.: PCT/JP2017/033265
§ 371 (c)(1),
(2) Date: Mar. 13, 2019

(87) PCT Pub. No.: WO2018/061799
PCT Pub. Date: Apr. 5, 2018

(65) Prior Publication Data
US 2019/0275854 A1 Sep. 12, 2019

(30) Foreign Application Priority Data
Sep. 27, 2016 (JP) ................................ 2016-188144

(51) Int. Cl.
*B60G 17/052* (2006.01)
*B60G 17/015* (2006.01)

(52) U.S. Cl.
CPC ....... *B60G 17/0525* (2013.01); *B60G 17/015* (2013.01); *B60G 17/0155* (2013.01);
(Continued)

(58) Field of Classification Search
CPC ............ B60G 17/0523; B60G 17/0525; B60G 17/052; B60G 17/015; B60G 17/0155;
(Continued)

(56) References Cited

U.S. PATENT DOCUMENTS

| 4,799,707 A | 1/1989 | Buma et al. |
| 2001/0004443 A1 | 6/2001 | Behmenburg et al. |

(Continued)

FOREIGN PATENT DOCUMENTS

| JP | 55-53894 | 12/1980 |
| JP | 6-5206 | 2/1994 |

(Continued)

OTHER PUBLICATIONS

International Search Report dated Dec. 19, 2017 in International (PCT) Application No. PCT/JP2017/033265.

*Primary Examiner* — Karen Beck
(74) *Attorney, Agent, or Firm* — Wenderoth, Lind & Ponack, L.L.P.

(57) ABSTRACT

An air suspension system includes a tank, a tank-side open/close valve, an air suspension-side open/close valve, a system portion, and the like. The system portion includes a compressor, an air drier, and a first passage and a second passage provided between the tank-side open/close valve and the air suspension-side open/close valve in parallel, a discharge valve, a tank-side control valve, an air suspension-side control valve, and the like. Due to this configuration, the air suspension system regenerates the air drier by opening the discharge valve to thus cause the air in the second passage to flow from an opposite side toward one side of the air drier when no power is supplied to the tank-side control valve and the air suspension-side control valve.

5 Claims, 8 Drawing Sheets

(52) U.S. Cl.
CPC ........ *B60G 17/052* (2013.01); *B60G 17/0523* (2013.01); *B60G 2202/152* (2013.01); *B60G 2500/2021* (2013.01); *B60G 2500/302* (2013.01); *B60G 2600/66* (2013.01)

(58) Field of Classification Search
CPC ...... B60G 2500/2021; B60G 2500/302; B60G 2600/66
See application file for complete search history.

(56) References Cited

U.S. PATENT DOCUMENTS

2002/0136645 A1    9/2002  Folchert et al.
2020/0164713 A1*  5/2020  Kim .................. B60G 17/0525

FOREIGN PATENT DOCUMENTS

| | | | |
|---|---|---|---|
| JP | 2001-206037 | 7/2001 | |
| JP | 2002-337531 | 11/2002 | |
| JP | 2006-240727 | 9/2006 | |
| WO | WO-2017057224 A1 * | 4/2017 | .............. F04B 39/12 |

* cited by examiner

AIR SUSPENSION SYSTEM

TECHNICAL FIELD

The present invention relates to an air suspension system mounted on a vehicle, such as a four-wheeled automobile.

BACKGROUND ART

Some of vehicles such as four-wheeled automobiles are equipped with a closed air suspension system for adjusting a vehicle height (for example, refer to PTL 1). The air suspension system according to this kind of related technique includes an air suspension disposed between a vehicle body and an axle and configured to adjust the vehicle height according to supply/discharge of air, a compressor configured to compress the air, a tank storing the air compressed by this compressor, and an air drier configured to dry the compressed air.

CITATION LIST

Patent Literature

[PTL 1] Japanese Patent Application Public Disclosure No. 2001-206037

SUMMARY OF INVENTION

Technical Problem

Then, in the closed air suspension system according to the related technique, the compressor is disposed between the air suspension and the tank, and they are connected to each other via passages formed by pipes and the like. The compressed air in these pipes should be dried via the air drier. However, the air drier may cause the compressed air containing moisture to remain in the pipes unless being subjected to efficient regeneration processing, which leads to a desire for realization of an efficient air purge in the pipes and the air drier.

The present invention has been made inconsideration of the drawback of the above-described related technique, and an object of the present invention is to provide an air suspension system capable of efficiently purging the air in the pipes and the air drier and allowing the compressed air in the pipes to be kept in a dried state.

Solution to Problem

According to one aspect of the present invention, an air suspension system includes an air suspension disposed between a vehicle body and an axle and configured to adjust a vehicle height according to supply and discharge of air, a system portion including a compressor configured to compress the air, a tank configured to store the air compressed by the compressor, a first open/close valve provided between the system portion and the tank and configured to permit and prohibit a flow of the air between them, and a second open/close valve provided between the system portion and the air suspension and configured to permit and prohibit a flow of the air between them. The system portion includes a first passage connecting the first open/close valve side and the second open/close valve side therebetween and connected to an intake side of the compressor, a second passage connecting the first open/close valve side and the second open/close valve side therebetween, provided in parallel with the first passage, and connected to a discharge side of the compressor, an air drier having one side connected to the discharge side of the compressor and an opposite side connected to the second passage, a discharge valve provided between the discharge side of the compressor and one side of the air drier and capable of emitting the air out of the system portion, a first control valve disposed between the first and second passage and the first open/close valve. The first control valve is configured to bring the first passage out of communication with the first open/close valve and also bring the second passage into communication with the first open/close valve when no power is supplied, and bring the first passage into communication with the first open/close valve and also bring the second passage out of communication with the first open/close valve when power is supplied. The system portion further includes a second control valve disposed between the first and second passage and the second open/close valve. The second control valve is configured to bring the first passage out of communication with the second open/close valve and also bring the second passage into communication with the second open/close valve when no power is supplied, and bring the first passage into communication with the second open/close valve and also bring the second passage out of communication with the second open/close valve when power is supplied. The air suspension system regenerates the air drier by opening the discharge valve to thus cause the air in the second passage to flow from an opposite side toward the one side of the air drier when no power is supplied to the first and second control valves.

According to the one aspect of the present invention, the air suspension system can efficiently purge the air in the second passage (the pipe) and the air drier, thereby keeping the compressed air in the second passage in the dried state.

DESCRIPTION OF EMBODIMENTS

In the following description, a closed air suspension system according to an embodiment of the present invention will be described in detail with reference to the accompanying drawings, based on an example in which this air suspension system is mounted on a vehicle such as a four-wheeled automobile.

Figure 1:
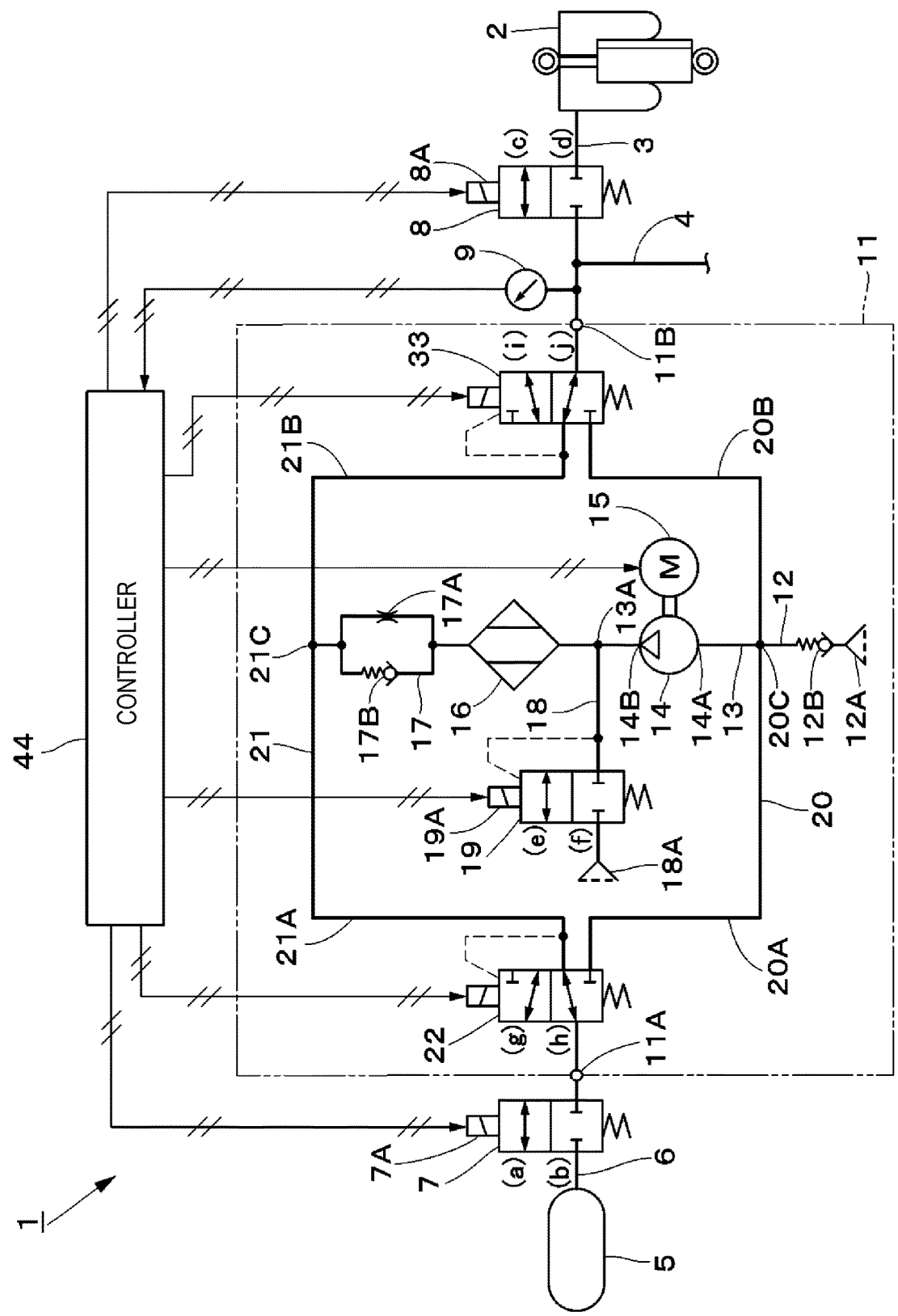
FIG. 1 is a circuit diagram illustrating an entire configuration of an air suspension system according to an embodiment.

FIGS. 1 to 8 illustrate the embodiment of the present invention. In FIG. 1, an air suspension system 1 intended to be mounted on a vehicle includes an air suspension 2, a tank 5, a system portion 11, and the like.

The air suspension 2 is provided so as to be positioned on each of a front wheel side and a rear wheel side of the vehicle and disposed between a vehicle body side and an axle side of the vehicle (both are not illustrated). More specifically, four air suspensions 2 are provided so as to correspond to a left wheel and a right wheel on the front side and a left wheel and a right wheel on the rear side, respectively (only one of them is illustrated). The air suspension 2 functions to, when compressed air is supplied or discharged, adjust a vehicle height of the vehicle by extending or compressing vertically according to a supplied or discharged amount of air (a compressed air amount) at this time. The air suspension 2 is connected to the system portion 11 via a supply/discharge path 3.

Now, a proximal end of the supply/discharge path 3 is connected to an air suspension-side control valve 33 of the system portion 11, which will be described below, and a distal end of the supply/discharge path 3 is connected to the air suspension 2. A pressure sensor 9 and an air suspension-side open/close valve 8, which will be described below, are provided at intermediate positions of the supply/discharge path 3. Now, a supply/discharge path 4 branches off from the supply/discharge path 3, and is connected to each of the other not-illustrated air suspensions.

The tank 5 is provided so as to be connected to a tank conduit 6. This tank 5 functions to store (reserve) compressed air pressurized by a compressor 14, which will be described below. Due to this configuration, the air suspension system 1 can allow the compressed air stored in the tank 5 to flow to an intake side of the compressor 14, thereby reducing a time taken to supply high-pressure compressed air to the air suspension 2, when supplying the compressed air to the air suspension 2.

The tank conduit 6 is provided so as to be positioned between the tank 5 and a tank-side control valve 22 of the system portion 11. More specifically, a distal end of the tank conduit 6 is connected to the tank 5, and a proximal end of the tank conduit 6 is connected to the tank-side control valve 22 of the system portion 11.

A tank-side open/close valve 7 is positioned between the tank 5 and the tank-side control valve 22 of the system portion 11, and is provided at an intermediate position of the tank conduit 6. This tank-side open/close valve 7 is formed by a two-port two-position electromagnetic valve equipped with a solenoid (coil) 7A, and switching thereof is controlled by a controller 44, which will be described below. The tank-side open/close valve 7 is selectively switched to an open position (a) and a close position (b) due to power supply from the controller 44 to the solenoid 7A. At the open position (a), the tank-side open/close valve 7 opens the tank conduit 6, thereby permitting supply and discharge of the compressed air to and from the tank 5. At the close position (b), the tank-side open/close valve 7 closes the tank conduit 6, thereby blocking the supply and the discharge of the compressed air to and from the tank 5. In other words, the tank-side open/close valve 7 forms a first open/close valve that permits and blocks a flow of the air between the tank 5 and the system portion 11.

The open/close valve 8 on the air suspension side (hereinafter referred to as the air suspension-side open/close valve 8) is positioned between the air suspension 2 and the control valve 33 on the air suspension side (hereinafter referred to as the air suspension-side control valve 33) of the system portion 11, and is provided at the intermediate position of the supply/discharge path 3. This air suspension-side open/close valve 8 is formed by a two-port two-position electromagnetic valve equipped with a solenoid (coil) 8A, and switching thereof is controlled by the controller 44. The air suspension-side open/close valve 8 is selectively switched to an open position (c) and a close position (d) due to power supply from the controller 44 to the solenoid 8A. At the open position (c), the air suspension-side open/close valve 8 opens the supply/discharge path 3, thereby permitting supply and discharge of the compressed air to and from the air suspension 2. At the close position (d), the air suspension-side open/close valve 8 closes the supply/discharge path 3, thereby blocking the supply and the discharge of the compressed air to and from the air suspension 2. In other words, the air suspension-side open/close valve 8 forms a second open/close valve that permits and blocks a flow of the air between the air suspension 2 and the system portion 11.

The pressure sensor 9 is positioned between the air suspension-side open/close valve 8 and the air suspension-side control valve 33, and is provided at the intermediate position of the supply/discharge passage 3. This pressure sensor 9 can also detect pressures of the compressed air in the air suspension 2 and the tank 5 by detecting pressures in the supply/discharge passages 3 and 4.

The system portion 11 is provided so as to be positioned between the air suspension 2 and the tank 5. More specifically, a tank-side end portion of the system portion 11 is connected to the tank conduit 6 via a connection point 11A, and an air suspension-side end portion of the system portion 11 is connected to the supply/discharge passage 3 via a connection point 11B. As illustrated in FIG. 1, this system portion 11 includes an intake conduit 12, a main conduit 13, the compressor 14, an electric motor 15, an air dryer 16, a slow return valve 17, a discharge conduit 18, a discharge valve 19, first and second passages 20 and 21, the tank-side control valve 22 as a first control valve, the air suspension-side control valve 33 as a second control valve, and the like. The system portion 11 forms a pneumatic source that supplies the compressed air to the air suspension 2.

The intake conduit 12 is provided so as to be positioned at an intake side 14A of the compressor 14. More specifically, one end of the intake conduit 12 is in communication with outside via an intake filter 12A, and an opposite end of the intake conduit 12 is connected to the first passage 20. This intake conduit 12 functions to allow outside air or the atmosphere introduced from the intake filter 12A due to actuation of the compressor 14 to flow toward the compressor 14. An intake valve 12B is provided in the intake conduit 12. The intake valve 12B is formed by a check valve that prevents a reverse flow of the air introduced from the intake filter 12A.

The main conduit 13 connects the first passage 20 and the second passage 21, which will be described below, to each other therebetween. More specifically, an end portion of the main conduit 13 on an upstream side is connected to a connection point 20C of the first passage 20, and an end portion of the main conduit 13 on a downstream side is connected to a connection point 21C of the second passage 21. The main conduit 13 forms a supply/discharge conduit that supplies and discharges the compressed air to and from the air suspension 2. The compressor 14, the air drier 16, and the slow return valve 17 are provided in the main conduit 13.

The compressor 14 is positioned in the main conduit 13, and is formed by, for example, a reciprocating compressor, a scroll compressor, or the like. The compressor 14 is drive by the electric motor 15 serving as a driving source, such as a linear motor, a direct-current motor, or an alternating-current motor, and generates the compressed air by compressing the air introduced from the first passage 20 side or the intake conduit 12 side. Then, the compressor 14 discharges and thus supplies the compressed air toward the air drier 16. In this case, the intake side 14A of the compressor 14 is connected to the first passage 20 via the main conduit 13, and the discharge side 14B of the compressor 14 is connected to the air drier 16 via the main conduit 13.

The air drier 16 is provided so as to be positioned at an intermediate position of the main conduit 13. One side of the air drier 16 is connected to the discharge side 14B of the compressor 14, and an opposite side of the air drier 16 is connected to the second passage 21 via the slow return valve 17. This air drier 16 includes a moisture absorbent or the like (not illustrated) therein, and absorbs moisture by the internal moisture absorbent when the compressed air supplied from the compressor 14 flows in a forward direction toward the slow return valve 17. Then, the air drier 16 supplies the dried compressed air (the dry air) toward the air suspension 2 or the tank 5. On the other hand, the compressed air (the discharged air) flowing in a backward direction from the air suspension 2 toward the discharge conduit 18, which will be described below, flows backward in the air drier 16, thereby capturing the moisture absorbed by the moisture absorbent and thus regenerating this moisture absorbent.

The slow return valve 17 is located at an intermediate position of the main conduit 13, and is provided between the air drier 16 and the second passage 21. This slow return valve 17 is formed by a parallel circuit including an orifice 17A and a check valve 17B, and does not reduce a flow rate of the compressed air with respect to the flow in the forward direction as the check valve 17B is opened therefor. However, the check valve 17B is closed for the flow in the backward direction, and the compressed air at this time is subjected to a reduction in the flow rate thereof due to the orifice 17A and therefore flows backward slowly at a small flow rate inside the air drier 16.

The discharge conduit 18 is provided by branching off from a connection point 13A of the main conduit 13 between the discharge side 14B of the compressor 14 and the one side of the air drier 16. More specifically, one end of the discharge conduit 18 is connected to the main conduit 13 via the connection point 13A, and the opposite end of the discharge conduit 18 is in communication with outside via a discharge port 18A. This discharge conduit 18 is a conduit for discharging the compressed air in the air suspension 2 to the external atmosphere. The discharge valve 19 is provided at an intermediate position of the discharge conduit 18.

The discharge valve 19 is a valve that brings the discharge conduit 18 connected to the main conduit 13 into and out of communication with the atmosphere. This discharge valve 19 is formed by a two-port two-position electromagnetic valve equipped with a solenoid (coil) 19A, and switching thereof is controlled by the controller 44. The discharge valve 19 is selectively switched to an open position (e) and a close position (f) due to power supply from the controller 44 to the solenoid 19A. At the open position (e), the discharge valve 19 opens the discharge conduit 18, thereby permitting the discharge of the compressed air from the discharge port 18A. At the close position (f), the discharge valve 19 closes the discharge conduit 18, thereby blocking the discharge of the compressed air from the discharge port 18A. In other words, the discharge valve 19 is normally closed to bring the discharge conduit 18 out of communication with the discharge port 18A. Then, when being opened, the discharge valve 19 brings the discharge conduit 18 into communication with the discharge port 18A, thereby permitting the discharge (release) of the compressed air in the discharge conduit 18 to the atmosphere outside the system portion 11.

The first passage 20 is positioned between the air suspension 2 and the tank 5, and is formed by a pipe connecting the tank-side open/close valve 7 side and the air suspension-side open/close valve 8 side to each other therebetween. More specifically, a tank-side end portion of the first passage 20 is connected to the tank-side control valve 22, and an air suspension-side end portion of the first passage 20 is connected to the air suspension-side control valve 33. This first passage 20 connects the supply/discharge passage 3 and the tank conduit 6 to each other therebetween, and a portion at an intermediate position of the first passage 20 is connected to the intake side 14A of the compressor 14 (the upstream side of the main conduit 13). In this case, the first passage 20 includes a tank-side first passage 20A and a first passage 20B on the air suspension side (hereinafter referred to as the air suspension-side first passage 20B). The tank-side first passage 20A connects the tank-side control valve 22 and the connection point 20C of the main conduit 13 to each other therebetween. The air suspension-side first passage 20B connects the connection point 20C of the main conduit 13 and the air suspension-side control valve 33 to each other therebetween.

On the other hand, the second passage 21 is formed by a pipe positioned between the air suspension 2 and the tank 5, connecting the tank-side open/close valve 7 side and the air suspension-side open/close valve 8 side to each other therebetween, and provided in parallel with the first passage 20. More specifically, a tank-side end portion of the second passage 21 is connected to the tank-side control valve 22, and an air suspension-side end portion of the second passage 21 is connected to the air suspension-side control valve 33. This second passage 21 extends over the discharge side 14B of the compressor 14, thereby serving to connect the tank-side control valve 22 and the air suspension-side control valve 33 to each other therebetween. In this case, the second passage 21 includes a tank-side second passage 21A and a second passage 21B on the air suspension side (hereinafter referred to as the air suspension-side second passage 21B). The tank-side second passage 21A connects the tank-side control valve 22 and the connection point 21C of the main conduit 13 to each other therebetween. The air suspension-side second passage 21B connects the connection point 21C of the main conduit 13 and the air suspension-side control valve 33 to each other therebetween.

Figure 2:
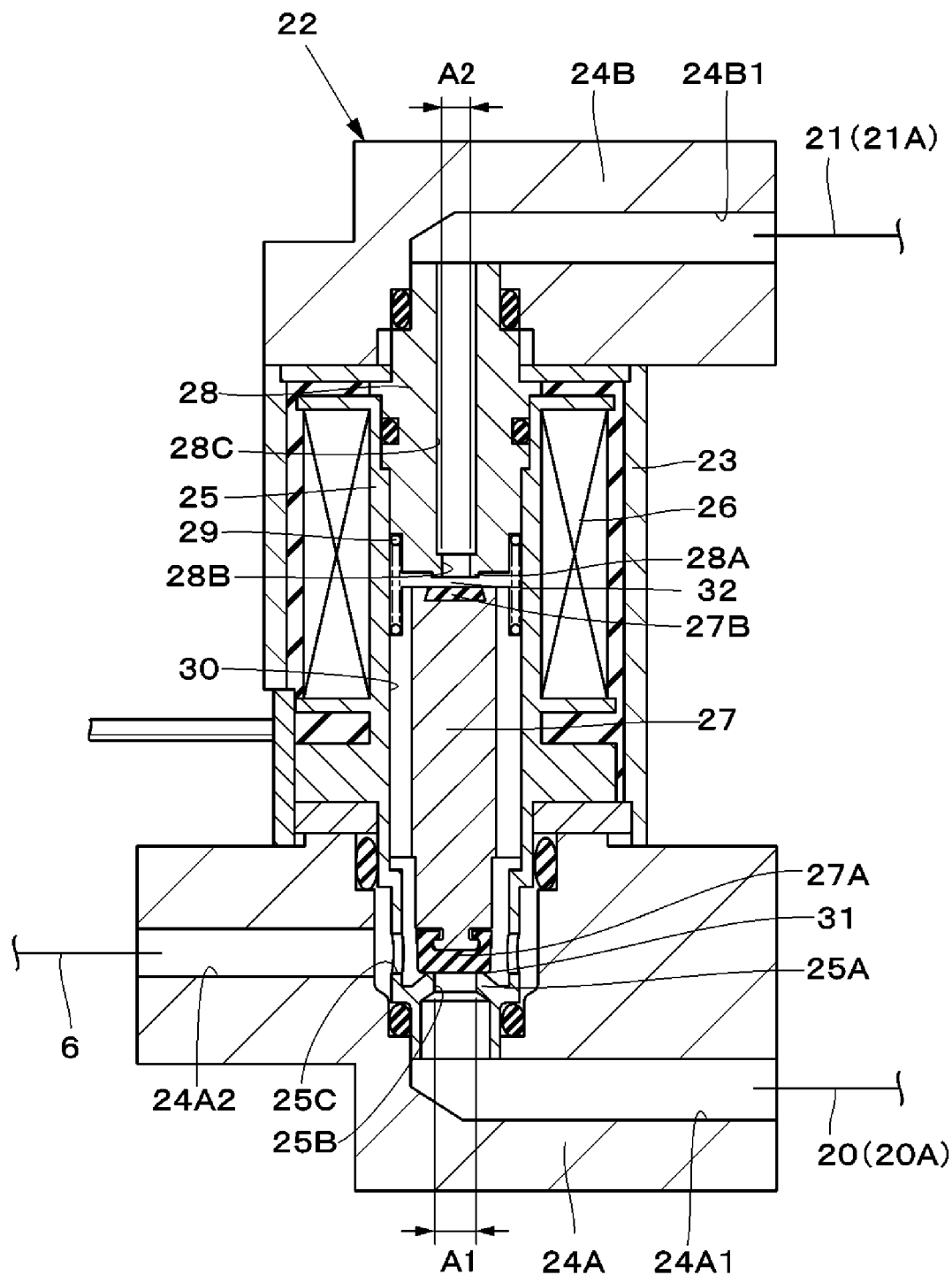
FIG. 2 is a cross-sectional view illustrating a first control valve in FIG. 1.

The tank-side control valve 22 is disposed between the first passage 20 and the second passage 21, and the tank-side open/close valve 7 as the first control valve. This tank-side control valve 22 is formed by, for example, a three-port two-position three-way electromagnetic valve and is controlled by the controller 44 to be switched to either a power supply position (g) and a non-power supply position (h) to selectively connect the tank conduit 6 to the first passage 20 or the second passage 21. As illustrated in FIG. 2, the tank-side control valve 22 includes a valve cylinder case 23, a valve holding cylinder 25, a coil 26, a first valve body 27, a core 28, a spring member 29, a first communication path 30, an opposite-side chamber 32 as a first pilot chamber, and the like.

In this case, the tank-side control valve 22 is selectively switched to the power supply position (g) and the non-power supply position (h) due to power supply from the controller 44 thereto. More specifically, the tank-side control valve 22 is placed at the power supply position (g) when power is supplied thereto, where the tank-side control valve 22 brings the first passage 20 into communication with the tank-side open/close valve 7 and also brings the second passage 21 out of communication with the tank-side open/close valve 7. On the other side, the tank-side control valve 22 is placed at the non-power supply position (h) when no power is supplied thereto, where the tank-side control valve 22 brings the first passage 20 out of communication with the tank-side open/close valve 7 and also brings the second passage 21 into communication with the tank-side open/close valve 7.

As illustrated in FIG. 2, the tank-side control valve 22 is formed as a cylindrical body with use of the valve cylinder case 23 serving as an outer shell thereof. The valve cylinder case 23 includes a one-side connection portion 24A on the first passage 20 side thereof and an opposite-side connection portion 24B on the second passage 21 side thereof. The one-side connection portion 24A is in communication with the first passage 20. The opposite-side connection portion 24B is in communication with the second passage 21. The valve holding cylinder 25 is arranged inside the coil 26 in the valve cylinder case 23. In this case, a one-side passage 24A1 and a common passage 24A2 are pierced in the one-side connection portion 24A. The one-side passage 24A1 is in communication with the first passage 20 and a first one-side port 25B, which will be described below. The common passage 24A2 is in communication with the tank conduit 6 and a first common port 25C, which will be described below. Further, an opposite-side passage 24B1 is pierced in the opposite-side connection portion 24B. The opposite-side passage 24B1 is in communication with the second passage 21 and an air vent path 28C, which will be described below.

The valve holding cylinder 25 is provided inside the valve cylinder case 23 and the coil 26, which will be described below. A one-side valve seat 25A, the first one-side port 25B, and the first common port 25C are provided on the first passage 20 side of the valve holding cylinder 25. The first valve body 27 is seated on and separated from the one-side valve seat 25A. The first one-side port 25B is brought out of communication with the second passage 21 by the first valve body 27, and is brought into communication with the first passage 20 via the one-side passage 24A1. The first common port 25C is in communication with the tank conduit 6 via the common passage 24A2. The coil 26 is wound on an outer peripheral side of the valve holding cylinder 25 at a position between this outer peripheral side and the valve cylinder case 23.

The first valve body 27 is arranged so as to axially face the core 28 in the valve holding cylinder 25, and is formed as a stepped cylindrical poppet valve. This first valve body 27 is slidably fittedly inserted in the valve holding cylinder 25 at a position between the one-side valve seat 25A of the valve holding cylinder 25 and the core 28. The first valve body 27 is formed with use of a magnetic material, and is driven as if being attracted to the core 28 side when the coil 26 is excited. A one-side valve portion 27A, which is seated on and separated from the one-side valve seat 25A, is provided on the first passage 20 side of the first valve body 27. An opposite-side valve portion 27B, which is seated on and separated from an opposite-side valve seat 28A of the core 28, is provided on the second passage 21 side of the first valve body 27. An outer diameter dimension of the first valve body 27 is formed so as to be sufficiently larger than hole diameters A1 and A2 of the first one-side port 25B and the first opposite-side port 28B, which will be described below.

In this case, the first valve body 27 functions selectively bring any one of the first passage 20 and the second passage 21 out of communication with the port of the tank-side open/close valve 7, and selectively bring the other of them into communication with the port of the tank-side open/close valve 7. More specifically, the first valve body 27 brings the second passage 21 out of communication with the port of the tank-side open/close valve 7 and brings the first passage 20 into communication with the port of the tank-side open/close valve 7 when power is supplied thereto. On the other hand, the first valve body 27 brings the first passage 20 out of communication with the port of the tank-side open/close valve 7 and brings the second passage 21 into communication with the port of the tank-side open/close valve 7 when no power is supplied thereto.

The core 28 is provided at a position between the opposite-side connection portion 24B and the first valve body 27. This core 28 is formed cylindrically with use of a magnetic material. The opposite-side valve seat 28A and a first opposite-side port 28B are provided on one side of the core 28. The opposite-side valve portion 27B of the first valve body 27 is seated on and separated from the opposite-side valve seat 28A. The first opposite-side port 28B brings the second passage 21 and the opposite-side chamber 32 into communication with each other therebetween. Further, the small-diameter air vent path 28C is axially pierced on a central side of the core 28. The air vent path 28C connects the opposite-side passage 24B1 and the first opposite-side port 28B to each other.

Then, the hole diameter A2 of the first opposite-side port 28B (for example, 2.2 mm) is formed so as to be smaller than the hole diameter A1 of the first one-side port 25B (for example, 3.0 mm). More specifically, a pressure-receiving area over which the first valve body 27 bears the pressure of the compressed air flowing into the first one-side port 25B is determined based on the hole diameter A1 when the first one-side port 25B is closed. Further, a pressure-receiving area over which the first valve body 27 bears the pressure of the compressed air flowing into the first opposite-side port 28B is determined based on the hole diameter A2 when the first opposite-side port 28B is closed. In this case, the pressure-receiving area based on the first opposite-side port 28B is smaller than or falls below the pressure-receiving area based on the first one-side port 25B.

Then, the spring member 29 is arranged between the first valve body 27 and the core 28, and this spring member 29 constantly biases the first valve body 27 toward the one-side valve seat 25A side of the valve holding cylinder 25. In other words, the spring member 29 constantly biases the first valve body 27 downward (i.e., in a direction for causing the first valve body 27 to close the first one-side port 25B). Further, the first communication path 30 is formed on an outer peripheral side of the first valve body 27. The first communication path 30 includes a plurality of vertical grooves extending in an axial direction of the first valve body 27 at a position between the outer peripheral side of the first valve body 27 and the valve holding cylinder 25. This first communication path 30 is constantly in communication with the first common port 25C and the common passage 24A2 at a position located on an outer peripheral side of the one-side valve portion 27A, and is constantly in communication with the opposite-side chamber 32 at a position located on an outer peripheral side of the opposite-side valve portion 27B. In other words, the first communication path 30 brings the opposite-side chamber 32 and the tank-side open/close valve 7 side into communication with each other therebetween.

A one-side chamber 31 of the tank-side control valve 22 is provided between the first valve body 27 and one side of the valve holding cylinder 25. More specifically, when power is supplied to the tank-side control valve 22, the first valve body 27 is separated from the one-side valve seat 25A of the valve holding cylinder 25 against the spring member 29 and the one-side valve portion 27A opens the first one-side port 25B, by which the one-side chamber 31 is formed.

On the other hand, the opposite-side chamber 32 of the tank-side control valve 22 is positioned on an axially opposite side of the first valve body 27 from the one-side chamber 31, and is provided between the first valve body 27 and the core 28. More specifically, when no power is supplied to the tank-side control valve 22 (i.e., when the tank-side control valve 22 is in a state illustrated in FIG. 2), the first valve body 27 is separated from the opposite-side valve seat 28A of the core 28 and the opposite-side valve portion 27B opens the first opposite-side port 28B, by which this opposite-side chamber 32 is formed. At this time, the opposite-side chamber 32 is placed into a state in communication with the second passage 21. The opposite-side chamber 32 forms the first pilot chamber that biases the first valve body 27 with use of the pressure of the compressed air in the second passage 21 in a direction for causing the one-side valve portion 27A to close the one-side valve seat 25A.

Figure 3:
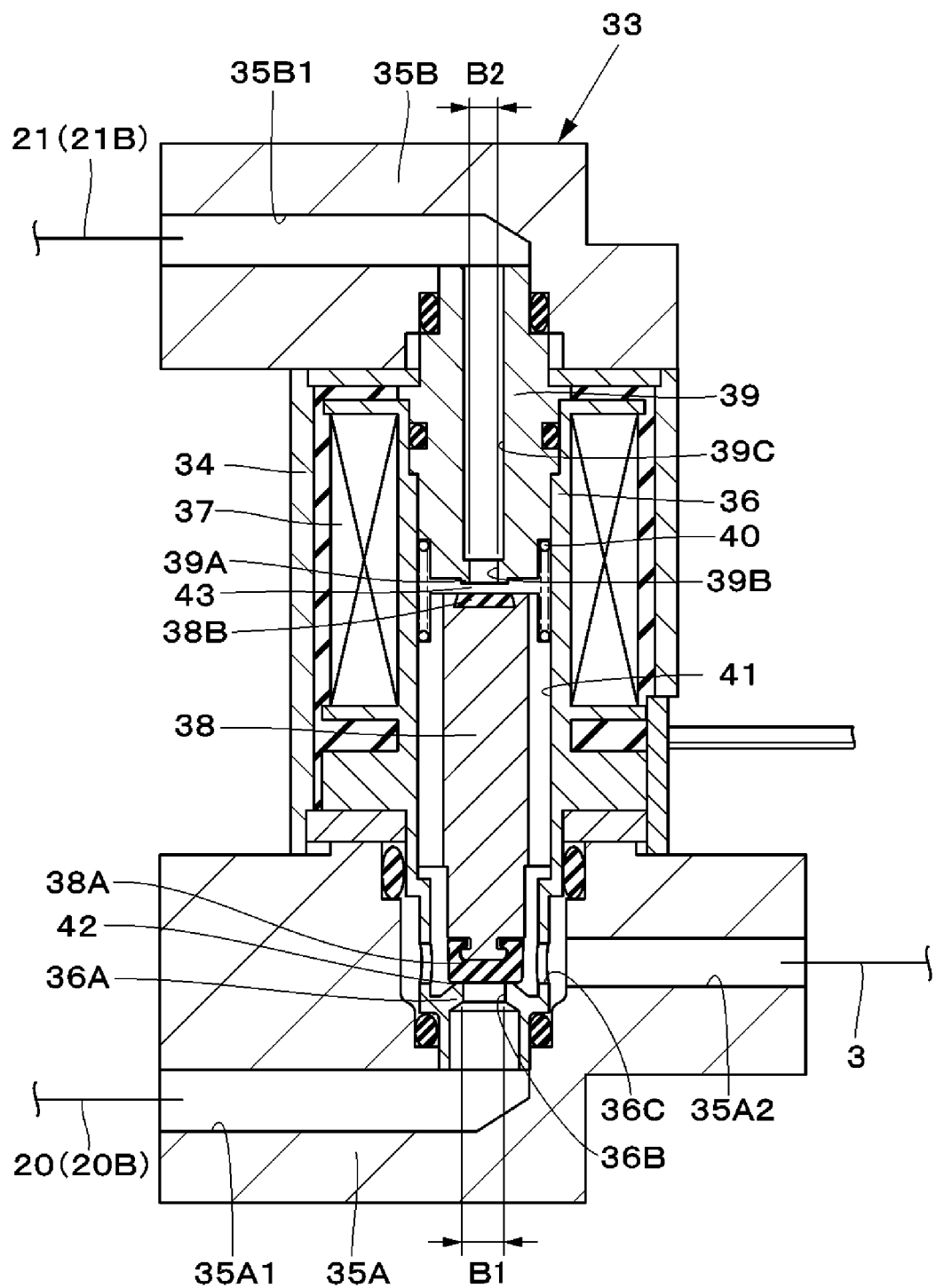
FIG. 3 is a cross-sectional view illustrating a second control valve in FIG. 1.

The air suspension-side control valve 33 is disposed between the first passage 20 and the second passage 21, and the air suspension-side open/close valve 8 as the second control valve. This air suspension-side control valve 33 is formed by, for example, a three-port two-position three-way electromagnetic valve and is controlled by the controller 44 to be switched to either a power supply position (i) and a non-power supply position (j) to selectively connect the supply/discharge path 3 to the first passage 20 or the second passage 21. As illustrated in FIG. 3, the air suspension-side control valve 33 includes a valve cylinder case 34, a valve holding cylinder 36, a coil 37, a second valve body 38, a core 39, a spring member 40, a second communication path 41, an opposite-side chamber 43 as a second pilot chamber, and the like.

In this case, the air suspension-side control valve 33 is selectively switched to the power supply position (i) and the non-power supply position (j) due to power supply from the controller 44 thereto. More specifically, the air suspension-side control valve 33 is placed at the power supply position (i) when power is supplied thereto, where the air suspension-side control valve 33 brings the first passage 20 into communication with the air suspension-side open/close valve 8 and also brings the second passage 21 out of communication with the air suspension-side open/close valve 8. On the other side, the air suspension-side control valve 33 is placed at the non-power supply position (j) when no power is supplied thereto, where the air suspension-side control valve 33 brings the first passage 20 out of communication with the air suspension-side open/close valve 8 and also brings the second passage 21 into communication with the air suspension-side open/close valve 8.

As illustrated in FIG. 3, the air suspension-side control valve 33 is formed as a cylindrical body with use of the valve cylinder case 34 serving as an outer shell thereof. The valve cylinder case 34 includes a one-side connection portion 35A on the first passage 20 side thereof and an opposite-side connection portion 35B on the second passage 21 side thereof. The one-side connection portion 35A is in communication with the first passage 20. The opposite-side connection portion 35B is in communication with the second passage 21. The valve holding cylinder 36 is arranged inside the coil 37 in the valve cylinder case 34. In this case, a one-side passage 35A1 and a common passage 35A2 are pierced in the one-side connection portion 35A. The one-side passage 35A1 is in communication with the first passage 20 and a second one-side port 36B, which will be described below. The common passage 35A2 is in communication with the supply/discharge path 3 and a second common port 36C, which will be described below. Further, an opposite-side passage 35B1 is pierced in the opposite-side connection portion 35B. The opposite-side passage 35B1 is in communication with the second passage 21 and an air vent path 39C, which will be described below.

The valve holding cylinder 36 is provided inside the valve cylinder case 34 and the coil 37, which will be described below. A one-side valve seat 36A, the second one-side port 36B, and the second common port 36C are provided on the first passage 20 side of the valve holding cylinder 36. The second valve body 38 is seated on and separated from the one-side valve seat 36A. The second one-side port 36B is brought out of communication with the second passage 21 by the second valve body 38, and is brought into communication with the first passage 20 via the one-side passage 35A1. The second common port 36C is in communication with the supply/discharge path 3 via the common passage 35A2. The coil 37 is wound on an outer peripheral side of the valve holding cylinder 36 at a position between this outer peripheral side and the valve cylinder case 34.

The second valve body 38 is arranged so as to axially face the core 39 in the valve holding cylinder 36, and is formed as a stepped cylindrical poppet valve. This second valve body 38 is slidably fittedly inserted in the valve holding cylinder 36 at a position between the one-side valve seat 36A of the valve holding cylinder 36 and the core 39. The second valve body 38 is formed with use of a magnetic material, and is driven as if being attracted to the core 39 side when the coil 37 is excited. A one-side valve portion 38A, which is seated on and separated from the one-side valve seat 36A, is provided on the first passage 20 side of the second valve body 38. An opposite-side valve portion 38B, which is seated on and separated from an opposite-side valve seat 39A of the core 39, is provided on the second passage 21 side of the second valve body 38. An outer diameter dimension of the second valve body 38 is formed so as to be sufficiently larger than hole diameters B1 and B2 of the second one-side port 36B and the second opposite-side port 39B, which will be described below.

In this case, the second valve body 38 functions to selectively bring any one of the first passage 20 and the second passage 21 out of communication with the port of the air suspension-side open/close valve 8, and selectively bring the other of them into communication with the port of the air suspension-side open/close valve 8. More specifically, the second valve body 38 brings the second passage 21 out of communication with the port of the air suspension-side open/close valve 8 and brings the first passage 20 into communication with the port of the air suspension-side open/close valve 8 when power is supplied thereto. On the other hand, the second valve body 38 brings the first passage 20 out of communication with the port of the air suspension-side open/close valve 8 and brings the second passage 21 into communication with the port of the air suspension-side open/close valve 8 when no power is supplied thereto.

The core 39 is provided at a position between the opposite-side connection portion 35B and the second valve body 38. This core 39 is formed cylindrically with use of a magnetic material. The opposite-side valve seat 39A and a second opposite-side port 39B are provided on one side of the core 39. The opposite-side valve portion 38B of the second valve body 38 is seated on and separated from the opposite-side valve seat 39A. The second opposite-side port 39B brings the second passage 21 and the opposite-side chamber 43 into communication with each other therebetween. Further, the small-diameter air vent path 39C is axially pierced on a central side of the core 39. The air vent path 39C connects the opposite-side passage 35B1 and the second opposite-side port 39B to each other.

Then, the hole diameter B2 of the second opposite-side port 39B (for example, 2.2 mm) is formed so as to be smaller than the hole diameter B1 of the second one-side port 36B (for example, 3.0 mm). More specifically, a pressure-receiving area over which the second valve body 38 bears the pressure of the compressed air flowing into the second one-side port 36B is determined based on the hole diameter B1 when the second one-side port 36B is closed. Further, a pressure-receiving area over which the second valve body 38 bears the pressure of the compressed air flowing into the second opposite-side port 39B is determined based on the hole diameter B2 when the second opposite-side port 39B is closed. In this case, the pressure-receiving area based on the second opposite-side port 39B falls below the pressure-receiving area based on the second one-side port 36B.

Then, the spring member 40 is arranged between the second valve body 38 and the core 39, and this spring member 40 constantly biases the second valve body 38 toward the one-side valve seat 36A side of the valve holding cylinder 36. In other words, the spring member 40 constantly biases the second valve body 38 downward (i.e., in a direction for causing the second valve body 38 to close the second one-side port 36B). Further, the second communication path 41 is formed on an outer peripheral side of the second valve body 38. The second communication path 41 includes a plurality of vertical grooves extending in an axial direction of the second valve body 38 at a position between the outer peripheral side of the second valve body 38 and the valve holding cylinder 36. This second communication path 41 is constantly in communication with the second common port 36C and the common passage 35A2 at a position located on an outer peripheral side of the one-side valve portion 38A, and is constantly in communication with the opposite-side chamber 43 at a position located on an outer peripheral side of the opposite-side valve portion 38B. In other words, the second communication path 41 brings the opposite-side chamber 43 and the air suspension-side open/close valve 8 side into communication with each other therebetween.

A one-side chamber 42 of the air suspension-side control valve 33 is provided between the second valve body 38 and the one side of the valve holding cylinder 36. More specifically, when power is supplied to the air suspension-side control valve 33, the second valve body 38 is separated from the one-side valve seat 36A of the valve holding cylinder 36 against the spring member 40 and the one-side valve portion 38A opens the second one-side port 36B, by which the one-side chamber 42 is formed.

On the other hand, the opposite-side chamber 43 of the air suspension-side control valve 33 is positioned on an axially opposite side of the second valve body 38 from the one-side chamber 42, and is provided between the second valve body 38 and the core 39. More specifically, when no power is supplied to the air suspension-side control valve 33 (i.e., when the air suspension-side control valve 33 is in a state illustrated in FIG. 3), the second valve body 38 is separated from the opposite-side valve seat 39A of the core 39 and the opposite-side valve portion 38B opens the second opposite-side port 39B, by which this opposite-side chamber 43 is formed. At this time, the opposite-side chamber 43 is placed into a state in communication with the second passage 21. The opposite-side chamber 43 forms the second pilot chamber that biases the second valve body 38 with use of the pressure of the compressed air in the second passage 21 in a direction for causing the one-side valve portion 38A to close the one-side valve seat 36A.

The controller 44 is formed by a microcomputer or the like as a control device that controls the supply and the discharge of the compressed air to and from the air suspension 2. As illustrated in FIG. 1, an input side of this controller 44 is connected to the pressure sensor 9 and the like, and an output side of the controller 44 is connected to the electric motor 15, the solenoid 7A of the tank-side open/close valve 7, the solenoid 8A of the air suspension-side open/close valve 8, the solenoid 19A of the discharge valve 19, the coil 26 of the tank-side control valve 22, the coil 37 of the air suspension-side control valve 33, and the like.

The controller 44 controls driving and stop of the electric motor 15, and controls opening and closing of the tank-side open/close valve 7, the air suspension-side open/close valve 8, the discharge valve 19, the tank-side control valve 22, and the air suspension-side control valve 33. More specifically, the controller 44 stores, for example, a map corresponding to a timing chart illustrated in FIG. 4, and controls the tank-side open/close valve 7, the air suspension-side open/close valve 8, the discharge valve 19, the tank-side control valve 22, and the air suspension-side control valve 33, thereby controlling the air suspension 2 serving as a vehicle height adjustment mechanism and thus adjusting the vehicle height of the vehicle. The controller 44 controls the driving and the stop of the electric motor 15 and also controls currents to be supplied to the tank-side open/close valve 7, the air suspension-side open/close valve 8, the discharge valve 19, the tank-side control valve 22, and the air suspension-side control valve 33 based on a detection signal input from the pressure sensor 9 and the like.

The air suspension system 1 according to the present embodiment is configured in the above-described manner, and an operation thereof will be described next.

First, when the compressed air is not sufficiently stored in the tank 5 (i.e., the pressure in the tank 5 is lower than a reference set pressure), the tank-side open/close valve 7 is switched from the close position (b) to the open position (a), and the tank-side control valve 22 and the air suspension-side control valve 33 are held at the non-power supply positions (h) and (j), respectively. Further, the air suspension-side open/close valve 8 and the discharge valve 19 are held at the close positions (d) and (f), respectively. Then, the compressor 14 is actuated (i.e., is driven to start the compression operation) by the electric motor 15.

Due to this operation, the compressor 14 introduces the atmosphere into the compressor 14 via the intake filter 12A and the intake valve 12B of the intake conduit 12 and the main conduit 13, pressurizes (compresses) this air, and discharges the compressed air toward the air drier 16. The compressed air discharged from the compressor 14 is dried by the air drier 16, and, after that, is stored into the tank 5 via the slow return valve 17, the tank-side second passage 21A, the tank-side control valve 22, the tank conduit 6, and the tank-side open/close valve 7. Then, for example, when the pressure in the tank 5 reaches the predetermined set pressure, the compressor 14 is stopped. Due to this operation, the inside of the tank 5 can be filled with a sufficient amount of the compressed air to store it. In this case, since the supply/discharge path 3 with the pressure sensor 9 provided therein is connected to the tank conduit 6, the controller 44 can monitor the pressure in the tank 5 via the pressure sensor 9. Further, the moisture absorbent in the air drier 16 is in a state containing moisture according to the introduction of the atmosphere into the compressor 14.

Figure 4:
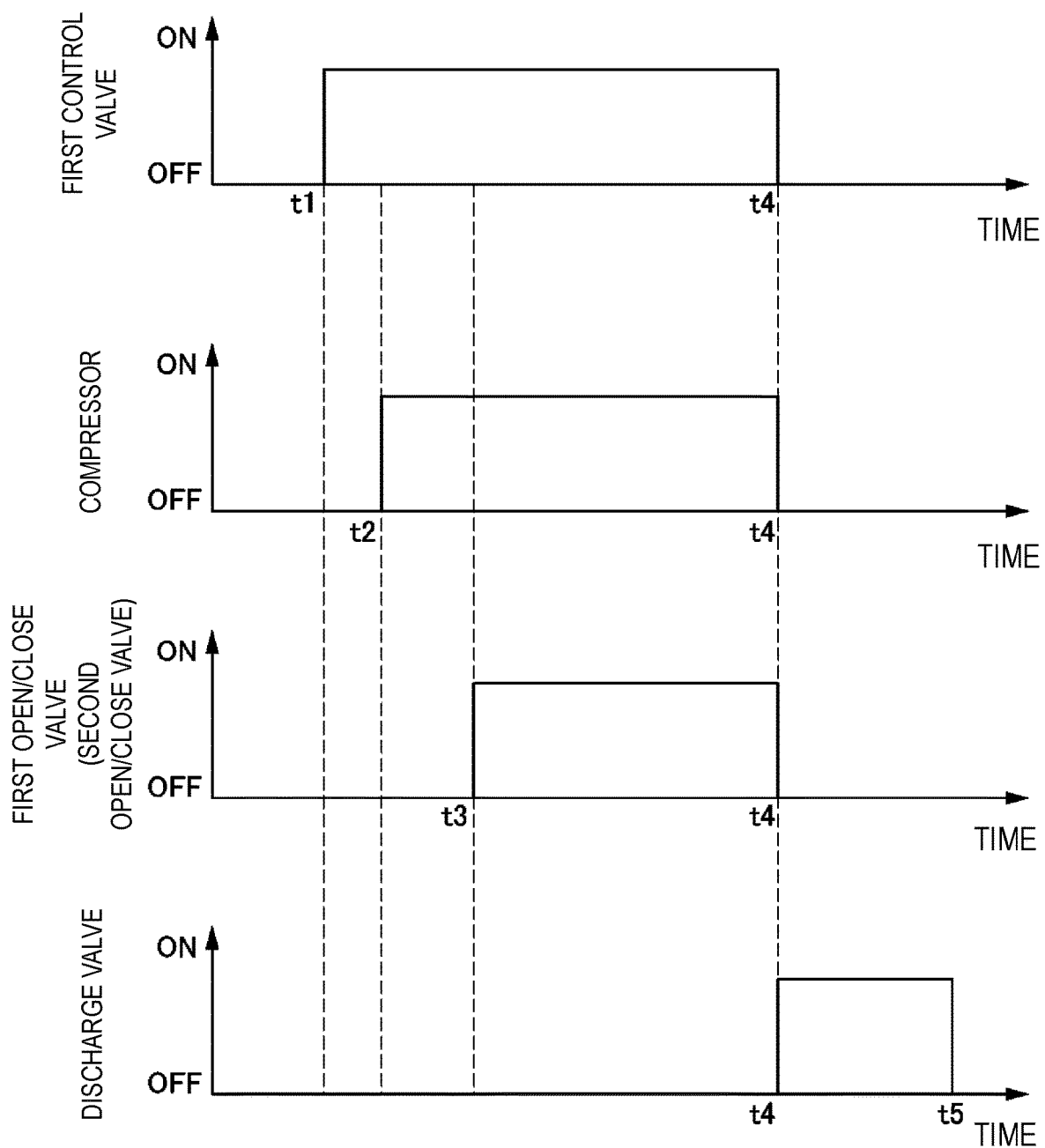
FIG. 4 is a timing chart illustrating changes over time in the first control valve, a compressor, a first open/close valve (a second open/close valve), and a discharge valve of the air suspension system according to the embodiment.

Next, when the vehicle height is raised with the use of the supply of the air from the tank 5 into the air suspension 2, the controller 44 controls the tank-side control valve 22 (the first control valve), the compressor 14 (the electric motor 15), the tank-side open/close valve 7 (the first open/close valve), the air suspension-side open/close valve 8 (the second open/close valve), the discharge valve 19, and the like according to the timing chart illustrated in FIG. 4.

Figure 5:
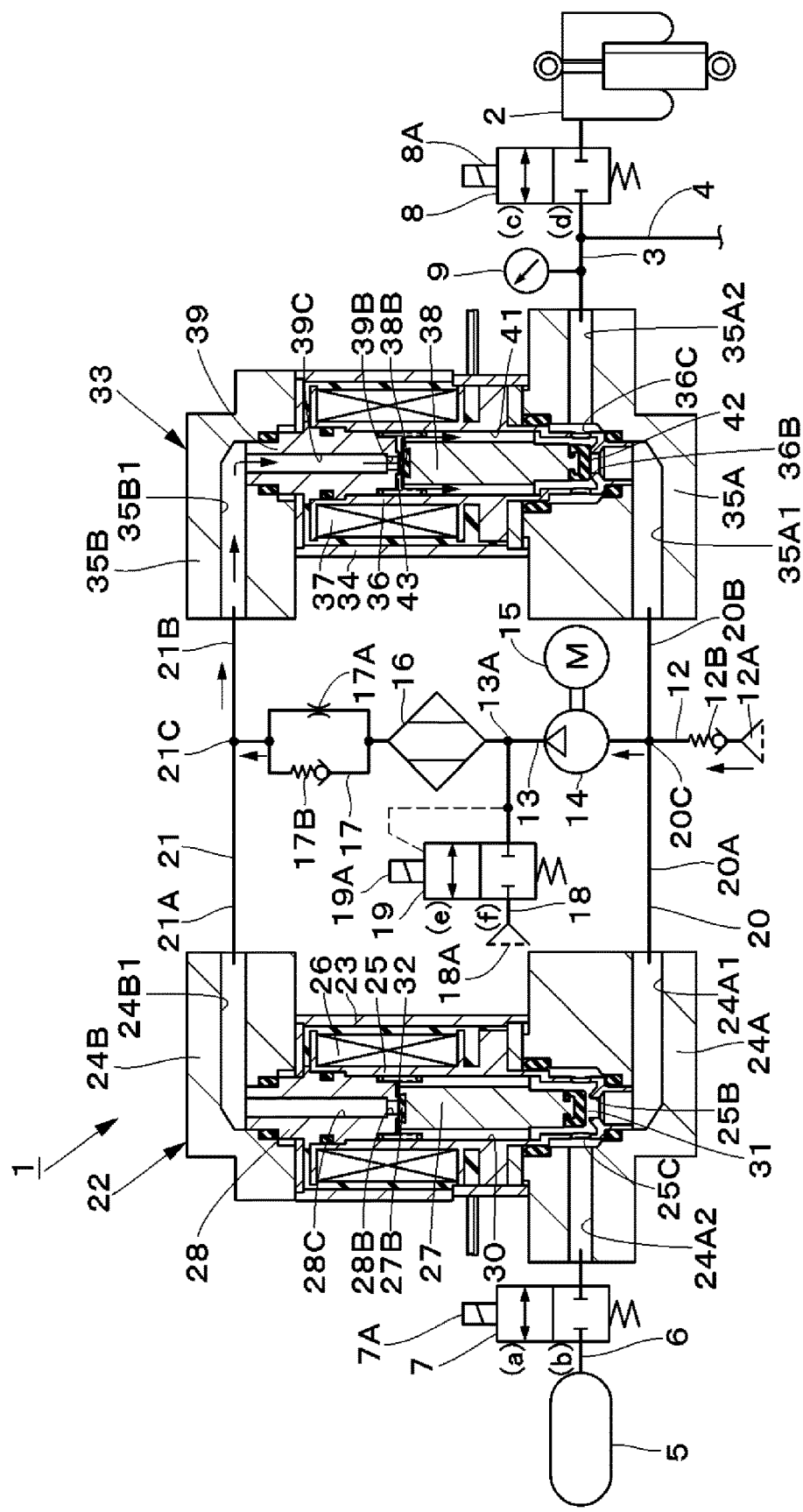
FIG. 5 is a circuit diagram illustrating a flow of compressed air when an atmosphere is introduced into the air suspension system.

First, as illustrated in FIGS. 4 and 5, at time t1, the controller 44 turns on the tank-side control valve 22, thereby switching it from the non-power supply position (h) to the power supply position (g). Further, the controller 44 holds the tank-side open/close valve 7, the air suspension-side open/close valve 8, and the discharge valve 19 at the close positions (b), (d), and (f), respectively, and also holds the air suspension-side control valve 33 at the non-power supply position (j).

Then, at time t2, the controller 44 actuates the compressor 14 by the electric motor 15, thereby introducing and compressing the atmosphere. The air compressed by the compressor 14 is dried by the air drier 16, and, after that, is supplied to the opposite-side chamber 43 by a predetermined pressure via the slow return valve 17, the air suspension-side second passage 21B, the opposite-side passage 35B1 of the opposite-side connection portion 35B, the air vent path 39C of the core 39, and the second opposite-side port 39B. The compressed air supplied to the opposite-side chamber 43 biases the second valve body 38 of the air suspension-side control valve 33 in a direction for closing the second one-side port 36B. In this case, the moisture absorbent in the air drier 16 is in a state containing moisture according to the introduction of the atmosphere into the compressor 14.

Now, the "predetermined pressure" refers to such a pressure that the second one-side port 36B is not opened by the pressure of the compressed air applied to the first passage 20. In other words, the "predetermined pressure" corresponds to the pressure of the compressed air generated by actuating the compressor 14 from time t2 to time t3.

Figure 6:
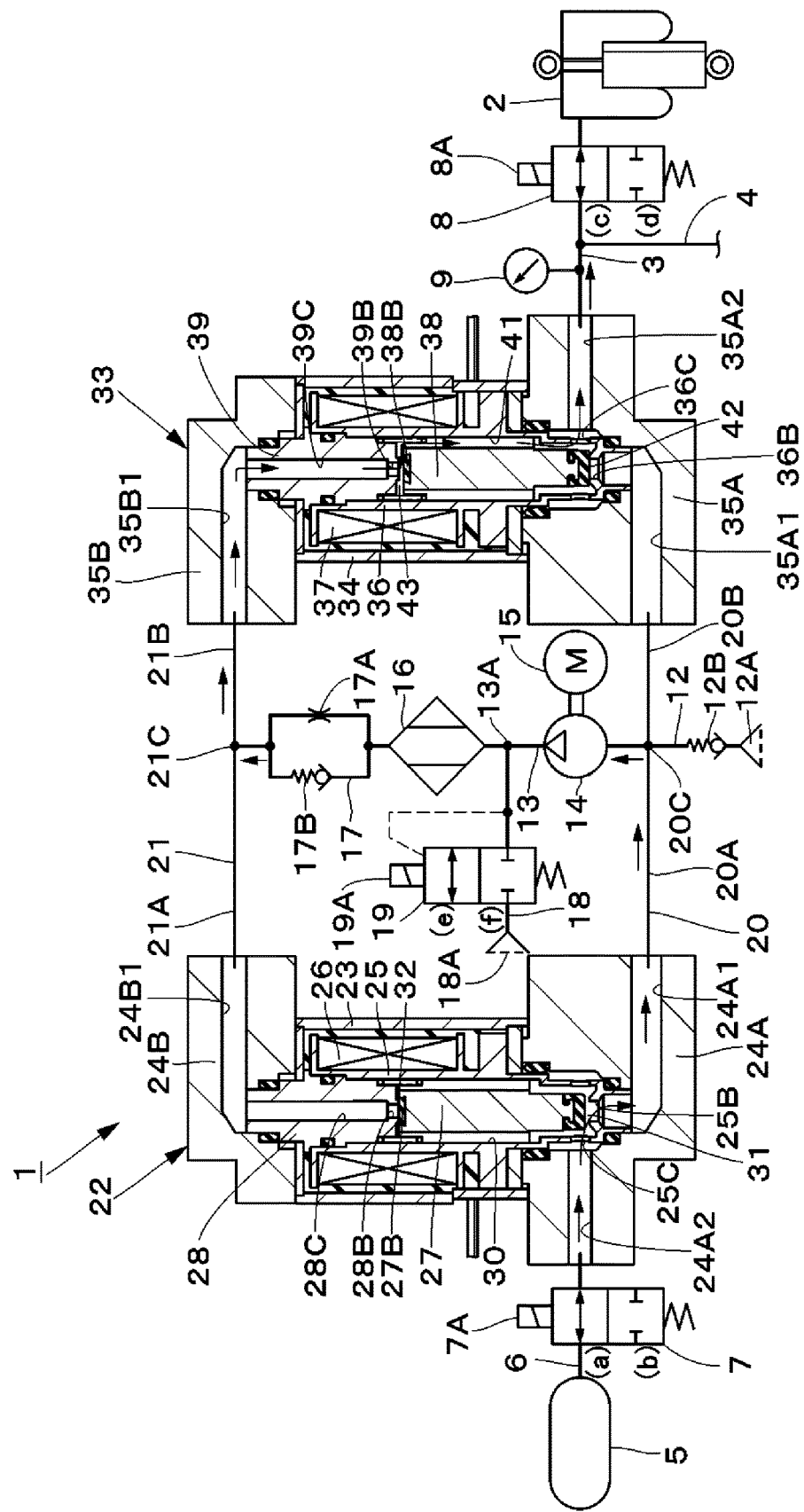
FIG. 6 is a circuit diagram illustrating a flow of the compressed air when the compressed air is supplied from the tank toward the air suspension system.

Next, as illustrated in FIGS. 4 and 6, at time t3, the controller 44 turns on the tank-side open/close valve 7 and the air suspension-side open/close valve 8, thereby switching them from the close positions (b) and (d) to the open positions (a) and (c), respectively. By this switching, the controller 44 brings the air suspension 2 and the tank 5 into communication with each other therebetween, thereby supplying the compressed air in the tank 5 toward the air suspension 2 via the tank conduit 6, the tank-side control valve 22, the tank-side first passage 20A, the main conduit 13, the air suspension-side second passage 21B, the air suspension-side control valve 33, and the supply/discharge path 3. In this case, the compressor 14 introduces the dried air in the tank 5, and therefore the moisture absorbent in the air drier 16 does not further absorb moisture from inside the compressed air.

In this case, the compressed air in the first passage 20 also applies the pressure to the second one-side port 36B of the air suspension-side control valve 33 via the air suspension-side first passage 20B of the first passage 20. However, the second valve body 38 is biased by the compressed air supplied to the opposite-side chamber 43 and the spring member 40 in the direction for closing the second one-side port 36B, so that the second one-side port 36B can be prevented from being opened.

More specifically, the compressed air supplied to the opposite-side chamber 43 is the high-pressure compressed air pressurized by the compressor 14, and therefore the compressed air supplied to the opposite-side chamber 43 has a higher pressure than the pressure of the compressed air supplied to the second one-side port 36B. In addition, the pressure-receiving area of the second valve body 38 based on the compressed air supplied to the opposite-side chamber 43 extends over the entire outer diameter of the second valve body 38, and therefore is larger than the pressure-receiving area of the second valve body 38 based on the compressed air supplied to the second one-side port 36B. As a result, the air suspension-side control valve 33 is held at the non-power supply position (j) illustrated in FIGS. 1 and 3, and the second valve body 38 is kept in a valve-closed state closing the second one-side port 36B even when the spring member 40 exerts only a weak biasing force. Therefore, the second valve body 38 is prevented from being inadvertently separated (opened) from the one-side valve seat 36A.

On the other hand, the compressed air in the second passage 21 also applies the pressure to the first opposite-side port 28B of the tank-side control valve 22 via the tank-side second passage 21A of the second passage 21. However, the first valve body 27 is biased in the direction for closing the first opposite-side port 28B due to the power supply to the coil 26, and therefore can be kept in the state closing the first opposite-side port 28B. In this case, the pressure-receiving area of the first valve body 27 based on the compressed air supplied to the one-side chamber 31 extends over the entire outer diameter of the first valve body 27, and therefore exceeds the pressure-receiving area of the first valve body 27 based on the compressed air supplied to the first opposite-side port 28B. As a result, the first opposite-side port 28B can be prevented from being inadvertently opened even when the coil 26 exerts only a weak excitation force (attraction force).

Figure 7:
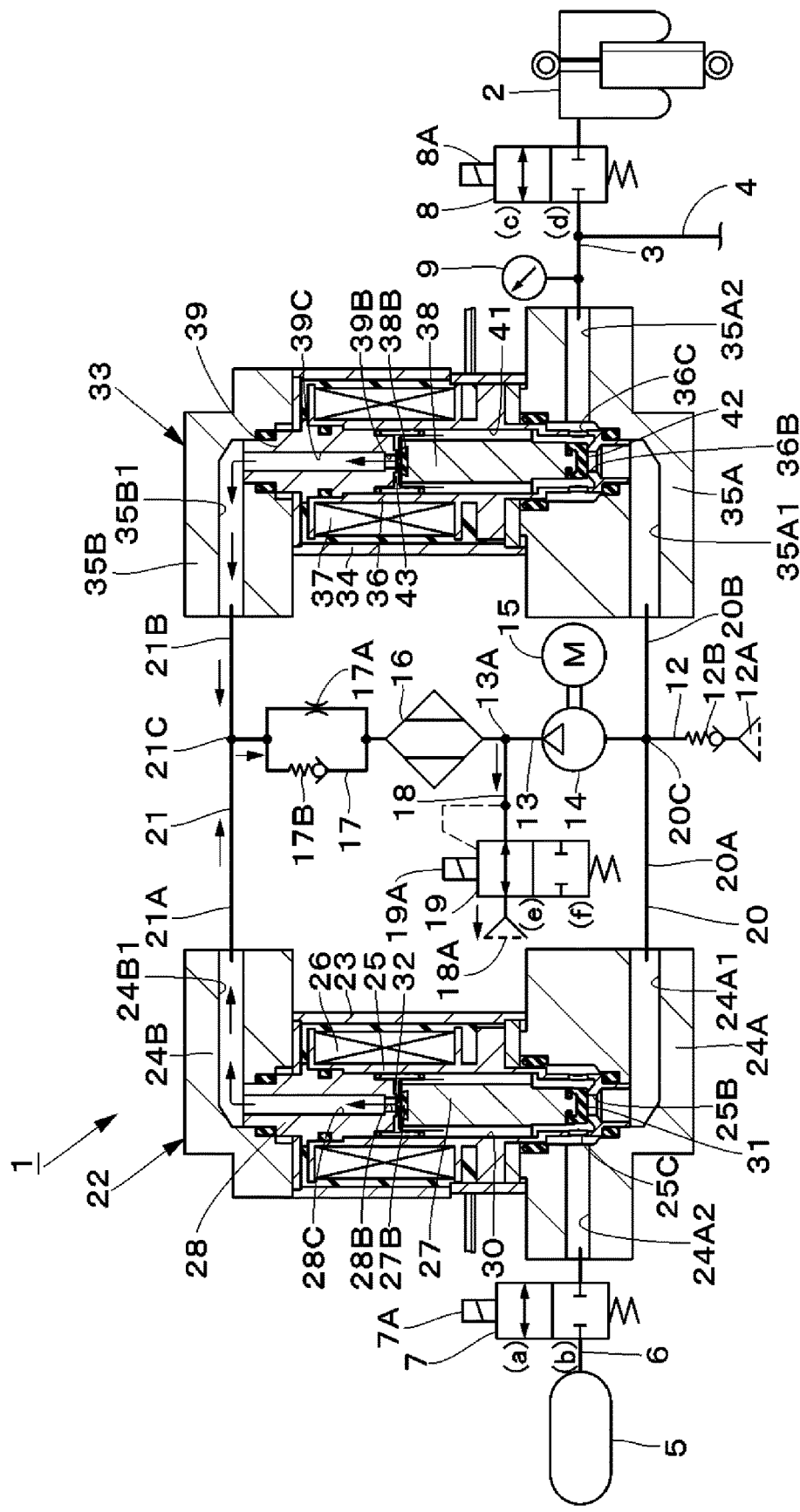
FIG. 7 is a circuit diagram illustrating a flow of the compressed air when the compressed air in the air suspension system is discharged outward.

After completion of the operation for raising the vehicle height, at time t4, the controller 44 turns off the tank-side control valve 22, the compressor 14, the tank-side open/close valve 7, and the air suspension-side open/close valve 8, and turns on the discharge valve 19, as illustrated in FIGS. 4 and 7. In other words, the controller 44 switches the tank-side open/close valve 7 and the air suspension-side open/close valve 8 from the open positions (a) and (c) to the close positions (b) and (d), thereby closing the supply/discharge path 3 and the tank conduit 6, respectively. As a result, the controller 44 can stop the outflow (the transmission) of the compressed air from the tank 5 and the supply of the compressed air to the air suspension 2, thereby keeping the air suspension 2 in the extension state and thus keeping the air suspension 2 in the state raising the vehicle height.

In the state illustrated in FIG. 7, to perform processing for regenerating the air drier 16, the controller 44 switches the tank-side control valve 22 from the power supply position (g) to the non-power supply position (h) to thus set both the tank-side control valve 22 and the air suspension-side control valve 33 to the non-power supply positions (h) and (j), respectively, and also switches the discharge valve 19 from the close position (f) to the open position (e). As a result, a part of the compressed air remaining in the tank-side control valve 22 (the common passage 24A2, the first common port 25C, the first communication path 30, the opposite-side chamber 32, the first opposite-side port 28B, the air vent path 28C, and the opposite-side passage 24B1), the air suspension-side control valve 33 (the common passage 35A2, the second common port 36C, the second communication path 41, the opposite-side chamber 43, the second opposite-side port 39B, the air vent path 39C, and the opposite-side passage 35B1), and the second passage 21 can be directly discharged outward from the discharge port 18A via the orifice 17A of the slow return valve 17, the air drier 16, and the discharge conduit 18.

In this case, the controller 44 turns on (opens) the discharge valve 19 from time t4 to time t5, thereby causing the compressed air discharged from inside the second passage 21 to flow from the opposite side to the one side of the air drier 16 in the backward direction toward the discharge conduit 18 via the connection point 13A of the main conduit 13. This operation allows the moisture to be removed from the moisture absorbent (a drying agent) loaded in the air drier 16, and leads to regeneration of the moisture absorbent. In other words, the controller 44 can perform the processing for regenerating the air drier 16 from time t4 to time t5 in consideration of a time period during which the air drier 16 has absorbed the atmosphere containing the moisture (for example, the time period during which the compressed air has been stored into the tank 5 and the time period from time t2 to time t3 in the operation of raising the vehicle height). Therefore, even when the compressed air is transmitted in the forward direction into the air drier 16 as will be described below, the compressed air can be prevented from becoming moist air containing moisture after passing through the air drier 16. The timing at which the discharge valve 19 is turned on is not limited to exactly time t4 and may be delayed from the timing at which the other devices (for example, the compressor 14) are turned off.

Figure 8:
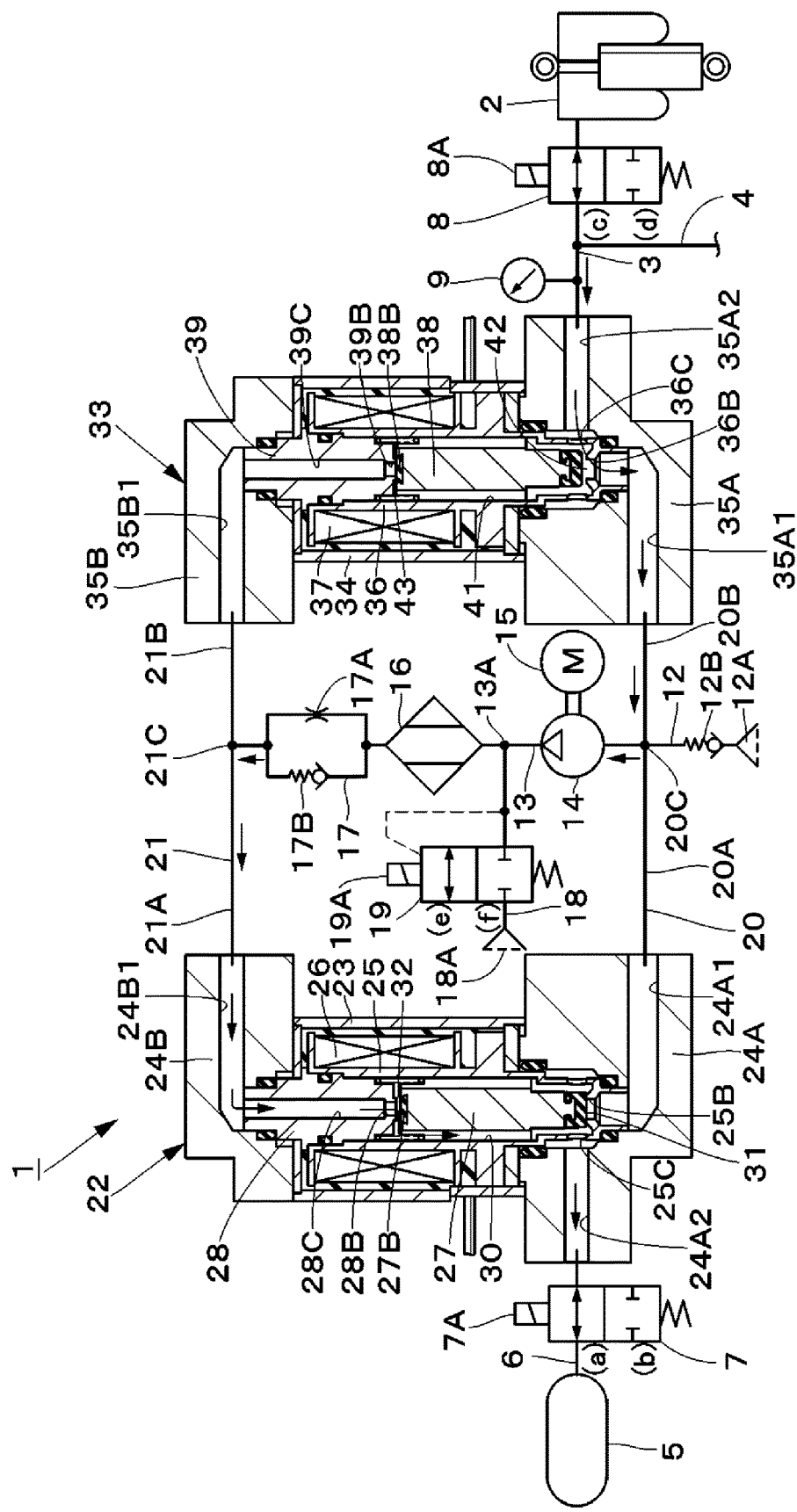
FIG. 8 is a circuit diagram illustrating a flow of the compressed air when the compressed air is discharged from the air suspension system toward the tank.

Next, when lowering the vehicle height, the controller 44 switches the tank-side open/close valve 7 and the air suspension-side open/close valve 8 from the close positions (b) and (d) to the open positions (a) and (c), respectively, and also switches the discharge valve 19 from the open position (e) to the close position (f), as illustrated in FIG. 8. Further, the controller 44 turns on the air suspension-side control valve 33, thereby switching it from the non-power supply position (i) to the power supply position (j).

When the compressor 14 is started to operate in this state, the compressed air in the air suspension 2 flows toward the intake side 14A of the compressor 14 via the supply/discharge path 3, the air suspension-side control valve 33, the air suspension-side first passage 20B, and the main conduit 13. Then, the compressed air in the air suspension 2 is introduced by the compressor 14 to be transmitted toward the air drier 16 side, and this compressed air is supplied so as to be stored into the tank 5 via the main conduit 13, the air drier 16, the tank-side second passage 21A, the tank-side control valve 22, and the tank conduit 6. As a result, the compressed air is discharged from the air suspension 2 and the air suspension 2 is displaced in a compression direction, by which the vehicle height can be lowered. In this case, the compressed air from the air suspension 2 passes through from the compressor 14 to the air drier 16 in the forward direction, but the moisture absorbent in the air drier 16 is already regenerated from time t4 to time t5 and therefore the compressed air flowing inside the air drier 16 in the forward direction is prevented from becoming moist air containing moisture.

When the vehicle height is lowered, the compressed air in the first passage 20 also applies the pressure to the first one-side port 25B of the tank-side control valve 22 via the tank-side first passage 20A of the first passage 20 as illustrated in FIG. 8 in an opposite manner from when the vehicle height is raised. However, the first valve body 27 is biased by the compressed air supplied to the opposite-side chamber 32 and the spring member 29 in the direction for closing the first one-side port 25B, and therefore the first valve body 27 can be prevented from performing an intended operation of incorrectly inadvertently opening the first one-side port 25B.

More specifically, since the compressed air supplied to the opposite-side chamber 32 is the high-pressure compressed air pressurized by the compressor 14, the compressed air supplied to the opposite-side chamber 32 has a higher pressure than the pressure of the compressed air supplied to the first one-side port 25B. In addition, the pressure-receiving area of the first valve body 27 based on the compressed air supplied to the opposite-side chamber 32 extends over the entire outer diameter of the first valve body 27, and therefore is larger than the pressure-receiving area of the first valve body 27 based on the compressed air supplied to the first one-side port 25B. As a result, the first valve body 27 can be prevented from performing the intended operation of opening the first one-side port 25B even when the spring member 29 exerts only a weak biasing force.

On the other hand, the compressed air in the second passage 21 applies the pressure to the second opposite-side port 39B of the air suspension-side control valve 33 via the air suspension-side second passage 21B of the second passage 21. However, the second valve body 38 is biased in the direction for closing the second opposite-side port 39B with power supplied to the coil 37, and therefore inadvertent opening of the second opposite-side port 39B can be prevented or reduced. In addition, the pressure-receiving area of the second valve body 38 based on the compressed air supplied to the one-side chamber 42 extends over the entire outer diameter of the second valve body 38, and therefore exceeds the pressure-receiving area of the second valve body 38 based on the compressed air supplied to the second opposite-side port 39B. As a result, the second opposite-side port 39B can be prevented from being inadvertently opened even when the coil 37 exerts only a weak excitation force (attraction force).

In this manner, according to the air suspension system 1 of the embodiment, the system portion 11 includes the tank-side control valve 22 configured to bring the first passage 20 out of communication with the tank-side open/close valve 7 and also bring the second passage 21 into communication with the tank-side open/close valve 7 when no power is supplied while bringing the first passage 20 into communication with the tank-side open/close valve 7 and also bringing the second passage 21 out of communication with the tank-side open/close valve 7 when power is supplied, and the air suspension-side control valve 33 configured to bring the first passage 20 out of communication with the air suspension-side open/close valve 8 and also bring the second passage 21 into communication with the air suspension-side open/close valve 8 when no power is supplied while bringing the first passage 20 into communication with the air suspension-side open/close valve 8 and also bringing the second passage 21 out of communication with the air suspension-side open/close valve 8 when power is supplied.

Due to this configuration, the air suspension system 1 can regenerate the air drier 16 by opening the discharge valve 19 to thus cause the air in the second passage 21 to flow from the opposite side toward the one side of the air drier 16 in the backward direction when no power is supplied to the tank-side control valve 22 and the air suspension-side control valve 33. As a result, the air suspension system 1 can efficiently purge the air in the second passage 21 and the air drier 16 when no power is supplied to the tank-side control valve 22 and the air suspension-side control valve 33, thereby keeping the compressed air in the second passage 21 in the dried state.

Then, some air suspension system may be configured to omit the air purge in the second passage 21 and the air drier 16 after the completion of the operation of raising the vehicle height. However, in such a case, the air suspension system involves a problem of having difficulty in keeping the inside of the second passage 21 in the dried state when driving the compressor 14 to lower the vehicle height since not regenerating the air drier 16. In other words, this configuration increases a possibility that the discharged air (the compressed air) from the air suspension 2 passes through inside the air drier 16 containing moisture when flowing through the compressor 14 and the air drier 16 in the forward direction.

On the other hand, the air suspension system 1 according to the present embodiment discharges the compressed air remaining in the tank-side control valve 22, the air suspension-side control valve 33, and the second passage 21 outward, thereby performing the processing for regenerating the air drier 16, after completing the operation of raising the vehicle height. Due to this operation, the air suspension system 1 can keep the inside of the second passage 21 in the dried state. As a result, when the vehicle height is lowered, the compressed air in the air suspension 2 is supposed to pass through inside the air drier 16 processed by the regeneration processing in advance, and therefore the compressed air in the dried state can be supplied so as to be stored from the second passage 21 into the tank 5.

Further, the tank-side control valve 22 includes the first valve body 27 configured to selectively bring any one of the first passage 20 and the second passage 21 out of communication with the tank-side open/close valve 7 and selectively bring the other of them into communication with the tank-side open/close valve 7, the spring member 29 configured to constantly bias this first valve body 27 in the valve-closing direction, the opposite-side chamber 32 configured to be formed due to the movement of the first valve body 27 in the valve-closing direction and brought into communication with the second passage 21 when no power is supplied, and the first communication path 30 configured to bring this opposite-side chamber 32 and the tank-side open/close valve 7 side into communication with each other therebetween. The air suspension-side control valve 33 includes the second valve body 38 configured to selectively bring any one of the first passage 20 and the second passage 21 out of communication with the air suspension-side open/close valve 8 and selectively bring the other of them into communication with the air suspension-side open/close valve 8, the spring member 40 configured to constantly bias this second valve body 38 in the valve-closing direction, the opposite-side chamber 43 configured to be formed due to the movement of the second valve body 38 in the valve-closing direction and brought into communication with the second passage 21 when no power is supplied, and the second communication path 41 configured to bring this opposite-side chamber 43 and the air suspension-side open/close valve 8 side into communication with each other therebetween.

Due to this configuration, the first valve body 27 can be pressed in the direction for closing the first one-side port 25B due to the inflow of the compressed air into the opposite-side chamber 32 of the tank-side control valve 22. Further, the second valve body 38 can be pressed in the direction for closing the second one-side port 36B due to the inflow of the compressed air into the opposite-side chamber 43 of the air suspension-side control valve 33. As a result, the air suspension system 1 can reduce the size of the spring member 29, which biases the first valve body 27 in the direction for closing the first one-side port 25B, and the size of the spring member 40, which biases the second valve body 38 in the direction for closing the second one-side port 36B, thereby reducing the sizes of the tank-side control valve 22 and the air suspension-side control valve 33.

Further, due to the reduction in the size of the spring member 29, the air suspension system 1 can reduce the force required to bias the first valve body 27 in the direction for closing the first opposite-side port 28B when power is supplied to the tank-side control valve 22. Due to this reduction, the air suspension system 1 can reduce the size of the coil 26 of the tank-side control valve 22. Regarding the air suspension-side control valve 33, the air suspension system 1 can also reduce the size of the coil 37 of the air suspension-side control valve 33 due to the reduction in the size of the spring member 40.

In this case, the opposite-side chamber 32 in communication with the second passage 21 is formed by the spring member 29 when no power is supplied to the tank-side control valve 22. Due to this configuration, the air suspension system 1 can discharge the air in the opposite-side chamber 32 outward via the second passage 21, the air drier 16, the discharge conduit 18, and the like by opening the discharge valve 19 when no power is supplied to the tank-side control valve 22. As a result, the air suspension system 1 can efficiently purge the air in the opposite-side chamber 32 when no power is supplied to the tank-side control valve 22, thereby keeping the compressed air in the tank-side control valve 22 in the dried state.

Further, similarly regarding the air suspension-side control valve 33, the air suspension system 1 can efficiently purge the air in the opposite-side chamber 43 when no power is supplied to the air suspension-side control valve 33, thereby keeping the compressed air in the air suspension-side control valve 33 in the dried state.

More specifically, the air suspension system 1 can reduce the pressure applied from the second passage 21 side to the first valve body 27 of the tank-side control valve 22 and the second valve body 38 of the air suspension-side control valve 33 by discharging outward the compressed air remaining in the tank-side control valve 22, the air suspension-side control valve 33, and the second passage 21. Due to this configuration, the air suspension system 1 can easily displace the first valve body 27 and the second valve body 38 toward the second passage 21 side when power is supplied to the tank-side control valve 22 and the air suspension-side control valve 33, thereby achieving the reductions in the sizes of the coils 26 and 37.

Further, the air suspension system 1 is configured to open the tank-side open/close valve 7 after the predetermined pressure of the compressed air is supplied to the opposite-side chamber 43 with power supplied to the tank-side control valve 22, when supplying the compressed air from the tank 5 to the air suspension 2. Due to this configuration, the air suspension system 1 can press the second valve body 38 of the air suspension-side control valve 33 by the compressed air in the opposite-side chamber 43 in the direction for closing the second one-side port 36B, thereby preventing or reducing unintended actuation of the air suspension-side control valve 33 when raising the vehicle height. As a result, the air suspension system 1 can supply the predetermined compressed air to the air suspension 2 after this compressed air passes through the air drier 16, thereby improving reliability of the air suspension system 1.

Further, the tank-side control valve 22 is configured to be formed by the three-way electromagnetic valve including the first one-side port 25B configured to be brought out of communication with the second passage 21 and into communication with the first passage 20 by the first valve body 27, the first opposite-side port 28B configured to bring the second passage 21 and the opposite-side chamber 32 into communication with each other therebetween, and the first common port 25C configured to be brought into communication with the tank 5. Further, the air suspension-side control valve 33 is configured to be formed by the three-way electromagnetic valve including the second one-side port 36B configured to be brought out of communication with the second passage 21 and into communication with the first passage 20 by the second valve body 38, the second opposite-side port 39B configured to bring the second passage 21 and the opposite-side chamber 43 into communication with each other therebetween, and the second common port 36C configured to be brought into communication with the air suspension 2.

Due to this configuration, the air suspension system 1 can connect the first passage 20 and the second passage 21 and the tank conduit 6 with use of the tank-side control valve 22, and connect the first passage 20 and the second passage 21 and the supply/discharge path 3 with use of the air suspension-side control valve 33. As a result, the air suspension system 1 can reduce design cost of the entire air suspension system 1.

Further, the air suspension system 1 is configured in such a manner that the hole diameter A2 of the first opposite-side port 28B is formed so as to be smaller than the hole diameter A1 of the first one-side port 25B. Due to this configuration, the air suspension system 1 allows the compressed air applied from the first opposite-side port 28B side to the first valve body 27 when the first opposite-side port 28B is closed to have a smaller pressure than the pressure of the compressed air applied from the first one-side port 25B side to the first valve body 27 when the first one-side port 25B is closed. As a result, the air suspension system 1 can press the first valve body 27 by the compressed air in the opposite-side chamber 32 in the direction closing the first one-side port 25B, thereby preventing or reducing unintended actuation of the tank-side control valve 22.

Further, the air suspension system 1 is configured in such a manner that the hole diameter B2 of the second opposite-side port 39B is formed so as to be smaller than the hole diameter B1 of the second one-side port 36B. Due to this configuration, the air suspension system 1 allows the compressed air applied from the second opposite-side port 39B side to the second valve body 38 when the second opposite-side port 39B is closed to have a smaller pressure than the pressure of the compressed air applied from the second one-side port 36B side to the second valve body 38 when the second opposite-side port 39B is closed. As a result, the air suspension system 1 can press the second valve body 38 by the compressed air in the opposite-side chamber 43 in the direction closing the second one-side port 36B, thereby preventing or reducing unintended actuation of the air suspension-side control valve 33.

Further, the tank-side control valve 22 and the air suspension-side control valve 33 are each configured to be formed by the poppet valve. Due to this configuration, the air suspension system 1 can use a simply structured poppet valve, thereby reducing manufacturing cost of the air suspension system 1. Further, the poppet valve (the first valve body 27 and the second valve body 38) operates with a short stroke and also lacks a slidable seal portion, and therefore the air suspension system 1 can prevent or reduce an air leak from the tank-side control valve 22 and the air suspension-side control valve 33, thereby prolonging lifetimes of the tank-side control valve 22 and the air suspension-side control valve 33.

Further, in the above-described embodiment, the air suspension system 1 is configured in such a manner that the hole diameter A2 of the first opposite-side port 28B is formed so as to be smaller than the hole diameter A1 of the first one-side port 25B, and the hole diameter B2 of the second opposite-side port 39B is formed so as to be smaller than the hole diameter B1 of the second one-side port 36B. However, the present invention is not limited thereto, and the hole diameter of the first opposite-side port may be equal to the hole diameter of the first one-side port. Further, the hole diameter of the second opposite-side port may be equal to the hole diameter of the second one-side port.

Further, in the above-described embodiment, the air suspension system 1 is configured to supply the compressed air from the air suspension 2 to the tank 5 via the air suspension-side first passage 20B, the main conduit 13, the compressor 14, and the tank-side second passage 21A when lowering the vehicle height. However, the present invention is not limited thereto, and may be configured to cause the compressed air to flow from the air suspension toward the tank directly without passing through the compressor when the pressure in the tank is lower than the pressure in the air suspension. In this case, the compressed air may be supplied directly to the tank via the first passage or may be supplied directly to the tank via the second passage.

Further, in the above-described embodiment, the air suspension system 1 is configured to open the discharge valve 19 to discharge the compressed air remaining in the second passage 21 outward after completing the operation for raising the vehicle height. However, the present invention is not limited thereto, and may be configured to open the discharge valve to discharge the compressed air remaining in the second passage outward immediately before adjusting the vehicle height next time.

Further, in the above-described embodiment, the air suspension system 1 is configured to include the four air suspensions 2 at the positions on the front wheel side and the rear wheel side of the vehicle. However, the present invention is not limited thereto, and may be configured to include the air suspensions on any one of the front wheel side and the rear wheel side of the vehicle. Further, the present invention may be applied to not only the four wheeled automobile but also another vehicle such as a two-wheeled vehicle.

Possible configurations as the air suspension system based on the above-described embodiment include the following examples.

According to a first configuration, an air suspension system includes an air suspension disposed between a vehicle body and an axle and configured to adjust a vehicle height according to supply and discharge of air, a system portion including a compressor configured to compress the air, a tank configured to store the air compressed by the compressor, a first open/close valve provided between the system portion and the tank and configured to permit and prohibit a flow of the air between them, and a second open/close valve provided between the system portion and the air suspension and configured to permit and prohibit a flow of the air between them. The system portion includes a first passage connecting the first open/close valve side and the second open/close valve side therebetween and connected to an intake side of the compressor, a second passage connecting the first open/close valve side and the second open/close valve side therebetween, provided in parallel with the first passage, and connected to a discharge side of the compressor, an air drier having one side connected to the discharge side of the compressor and an opposite side connected to the second passage, a discharge valve provided between the discharge side of the compressor and one side of the air drier and capable of emitting the air out of the system portion, a first control valve disposed between the first and second passage and the first open/close valve. The first control valve is configured to bring the first passage out of communication with the first open/close valve and also bring the second passage into communication with the first open/close valve when no power is supplied, and bring the first passage into communication with the first open/close valve and also bring the second passage out of communication with the first open/close valve when power is supplied. The system portion further includes a second control valve disposed between the first and second passage and the second open/close valve. The second control valve is configured to bring the first passage out of communication with the second open/close valve and also bring the second passage into communication with the second open/close valve when no power is supplied, and bring the first passage into communication with the second open/close valve and also bring the second passage out of communication with the second open/close valve when power is supplied. The air suspension system regenerates the air drier by opening the discharge valve to thus cause the air in the second passage to flow from an opposite side toward the one side of the air drier when no power is supplied to the first and second control valves. Due to this configuration, the air suspension system can efficiently purge the air in the second passage and the air drier.

As a second configuration, in the first configuration, the first control valve includes a first valve body configured to selectively bring any one of the first passage and the second passage out of communication with the first open/close valve and selectively bring the other of them into communication with the first open/close valve, a spring member configured to constantly bias this first valve body in a valve-closing direction, a first pilot chamber configured to be formed due to the movement of the first valve body in the valve-closing direction and brought into communication with the second passage when no power is supplied, and a first communication path configured to bring this first pilot chamber and the first open/close valve side into communication with each other therebetween. The second control valve includes a second valve body configured to selectively bring any one of the first passage and the second passage out of communication with the second open/close valve and selectively bring the other of them into communication with the second open/close valve, a spring member configured to constantly bias this second valve body in a valve-closing direction, a second pilot chamber configured to be formed due to the movement of the second valve body in the valve-closing direction and brought into communication with the second passage when no power is supplied, and a second communication path configured to bring this second pilot chamber and the second open/close valve side into communication with each other therebetween. Due to this configuration, due to this configuration, the air suspension system can efficiently purge the air in the first pilot chamber and the second pilot chamber.

As a third configuration, in the first or second configuration, the air suspension system introduces and compresses an atmosphere by driving the compressor with the first open/close valve closed and power supplied to the first control valve when supplying the air from the tank to the air suspension, and opens the first open/close valve after supplying a predetermined pressure of the compressed air to the second pilot chamber. Due to this configuration, the air suspension system can prevent or reduce unintended actuation of the second control valve when raising the vehicle height.

As a fourth configuration, in any of the first to third configurations, the first control valve includes a three-way electromagnetic valve. This three-way electromagnetic valve includes a first one-side port configured to be brought out of communication with the second passage and brought into communication with the first passage by the first valve body, a first opposite-side port configured to bring the second passage and the first pilot chamber into communication with each other therebetween, and a first common port configured to be brought into communication with the tank. The second control valve includes a three-way electromagnetic valve. This three-way electromagnetic valve includes a second one-side port configured to be brought out of communication with the second passage and brought into communication with the first passage by the second valve body, a second opposite-side port configured to bring the second passage and the second pilot chamber into communication with each other therebetween, and a second common port configured to be brought into communication with the air suspension. Due to this configuration, the air suspension system can reduce the number of control valves of the entire air suspension system, thereby reducing design cost of the entire air suspension system.

As a fifth configuration, in the fourth configuration, a hole diameter of the first opposite-side port is formed so as to be smaller than a hole diameter of the first one-side port. A hole diameter of the second opposite-side port is formed so as to be smaller than a hole diameter of the second one-side port. Due to this configuration, the air suspension system can facilitate opening and closing operations of the first valve body of the first control valve and the second valve body of the second control valve.

As a sixth configuration, in any of the first to fifth configurations, the first valve body of the first control valve and the second valve body of the second control valve are each formed as a poppet valve. Due to this configuration, the air suspension system can use a simply structured poppet valve, thereby reducing manufacturing cost of the air suspension system.

The present invention is not limited to the above-described embodiment, and includes various modifications. For example, the above-described embodiment has been described in detail to facilitate better understanding of the present invention, and the present invention is not necessarily limited to the configuration including all of the described features. Further, a part of the configuration of some embodiment can be replaced with the configuration of another embodiment, and some embodiment can also be implemented with a configuration of another embodiment added to the configuration of this embodiment. Further, each embodiment can also be implemented with another configuration added, deleted, or replaced with respect to a part of the configuration of this embodiment.

The present application claims priority under the Paris Convention to Japanese Patent Application No. 2016-188144 filed on Sep. 27, 2016. The entire disclosure of Japanese Patent Application No. 2016-188144 filed on Sep. 27, 2016 including the specification, the claims, the drawings, and the abstract is incorporated herein by reference in its entirety.

REFERENCE SIGN LIST 1 air suspension system
2 air suspension
5 tank
7 tank-side open/close valve (first open/close valve)
8 air suspension-side open/close valve (second open/close valve)
11 system portion
14 compressor
14A intake side
14B discharge side
16 air drier
20 first passage
21 second passage
22 tank-side control valve (first control valve)
25B first one-side port
25C first common port
27 first valve body
28B first opposite-side port
29 spring member
30 first communication path
32 opposite-side chamber (first pilot chamber)
33 air suspension-side control valve (second control valve)
36B second one-side port
36C second common port
38 second valve body
39B second opposite-side port
40 spring member
41 second communication path
43 opposite-side chamber (second pilot chamber)

The invention claimed is:

1. An air suspension system comprising:
an air suspension disposed between a vehicle body and an axle, and configured to adjust a vehicle height according to supply and discharge of air;
a system portion including a compressor configured to compress the air;
a tank configured to store the air compressed by the compressor;
a first open/close valve provided between the system portion and the tank, and configured to permit and prohibit a flow of the air between them; and
a second open/close valve provided between the system portion and the air suspension, and configured to permit and prohibit a flow of the air between them,
wherein the system portion includes
a first passage connecting the first open/close valve side and the second open/close valve side therebetween, and connected to an intake side of the compressor,
a second passage connecting the first open/close valve side and the second open/close valve side therebetween, provided in parallel with the first passage, and connected to a discharge side of the compressor,
an air drier having one side connected to the discharge side of the compressor and an opposite side connected to the second passage,
a discharge valve provided between the discharge side of the compressor and one side of the air drier, and capable of emitting the air out of the system portion,
a first control valve disposed between the first and second passage and the first open/close valve, the first control valve being configured to bring the first passage out of communication with the first open/close valve and also bring the second passage into communication with the first open/close valve when no power is supplied, and bring the first passage into communication with the first open/close valve and also bring the second passage out of communication with the first open/close valve when power is supplied, and
a second control valve disposed between the first and second passage and the second open/close valve, the second control valve being configured to bring the first passage out of communication with the second open/close valve and also bring the second passage into communication with the second open/close valve when no power is supplied, and bring the first passage into communication with the second open/close valve and also bring the second passage out of communication with the second open/close valve when power is supplied, and
wherein the air suspension system regenerates the air drier by opening the discharge valve to thus cause the air in the second passage to flow from an opposite side toward the one side of the air drier when no power is supplied to the first and second control valves, wherein the first control valve includes
a first valve body configured to selectively bring any one of the first passage and the second passage out of communication with the first open/close valve and selectively bring the other of them into communication with the first open/close valve,
a biasing member configured to constantly bias the first valve body in a valve-closing direction,
a first pilot chamber configured to be formed due to the movement of the first valve body in the valve-closing direction and brought into communication with the second passage when no power is supplied, and
a first communication path configured to bring the first pilot chamber and the first open/close valve side into communication with each other therebetween, and
wherein the second control valve includes
a second valve body configured to selectively bring any one of the first passage and the second passage out of communication with the second open/close valve and selectively bring the other of them into communication with the second open/close valve,
a biasing member configured to constantly bias the second valve body in a valve-closing direction,
a second pilot chamber configured to be formed due to the movement of the second valve body in the valve-closing direction and brought into communication with the second passage when no power is supplied, and
a second communication path configured to bring the second pilot chamber and the second open/close valve side into communication with each other therebetween.

2. The air suspension system according to claim 1, wherein the air suspension system introduces and compresses an atmosphere by driving the compressor with the first open/close valve closed and power supplied to the first control valve when supplying the air from the tank to the air suspension, and opens the first open/close valve after supplying a predetermined pressure of the compressed air to the second pilot chamber.

3. The air suspension system according to claim 1, wherein the first control valve includes a three-way electromagnetic valve, the three-way electromagnetic valve of the first control valve including
- a first one-side port configured to be brought out of communication with the second passage and brought into communication with the first passage by the first valve body,
- a first opposite-side port configured to bring the second passage and the first pilot chamber into communication with each other therebetween, and
- a first common port configured to be brought into communication with the tank, and wherein the second control valve includes a three-way electromagnetic valve, the three-way electromagnetic valve of the second control valve including
- a second one-side port configured to be brought out of communication with the second passage and brought into communication with the first passage by the second valve body,
- a second opposite-side port configured to bring the second passage and the second pilot chamber into communication with each other therebetween, and
- a second common port configured to be brought into communication with the air suspension.

4. The air suspension system according to claim 3, wherein a hole diameter of the first opposite-side port is formed so as to be smaller than a hole diameter of the first one-side port, and wherein a hole diameter of the second opposite-side port is formed so as to be smaller than a hole diameter of the second one-side port.

5. The air suspension system according to claim 1, wherein the first valve body of the first control valve and the second valve body of the second control valve are each formed as a poppet valve.

* * * * *